United States Patent [19]

Cheron

[11] 4,040,598
[45] Aug. 9, 1977

[54] DEVICE FOR THE SEALING OF A BLOCK FORMED OF A PILE OF PLATES, SUCH AS A BLOCK OF A FUEL CELL, WHILE MAINTAINING FREE PASSAGEWAYS BETWEEN THESE PLATES

[75] Inventor: Jacques Cheron, Versailles, France

[73] Assignee: Institut Francais du Petrole, des Carburants et Lubrifiants, France

[21] Appl. No.: 351,645

[22] Filed: Apr. 16, 1973

Related U.S. Application Data

[62] Division of Ser. No. 88,532, Nov. 12, 1970, abandoned.

[30] Foreign Application Priority Data

Nov. 13, 1969 France .................. 69.39099

[51] Int. Cl.² ............ B29C 5/00; B29C 6/00; B29C 1/12; B29C 1/14
[52] U.S. Cl. ................ 249/176; 249/83; 249/127; 249/142; 249/183; 249/205; 249/60
[58] Field of Search .......... 249/176, 219 R, 83, 249/85; 425/186, 405, 123, 805

[56] References Cited

U.S. PATENT DOCUMENTS

| 972,618 | 10/1910 | Haag | 249/216 X |
|---|---|---|---|
| 2,339,434 | 1/1944 | Stehlik | 425/123 |
| 2,402,338 | 6/1946 | Morehead | 264/261 X |
| 2,490,228 | 12/1949 | Pontiere | 249/216 X |
| 3,042,572 | 7/1962 | Verhulst | 249/83 X |
| 3,248,758 | 5/1966 | Schmitz et al. | 249/134 X |
| 3,537,677 | 11/1970 | Cotton et al. | 249/134 X |
| 3,648,965 | 3/1972 | Daddona | 249/134 |
| 3,656,730 | 4/1972 | Hogben et al. | 249/134 |
| 3,685,944 | 8/1972 | Roloff | 249/134 X |
| 3,778,020 | 12/1973 | Burrows | 249/219 R |

*Primary Examiner*—J. Howard Flint, Jr.
*Attorney, Agent, or Firm*—Craig & Antonelli

[57] ABSTRACT

Process for sealing a block formed of a piling of spaced plates while preserving passageways between several plates and on at least one edge of the block, comprising inserting into the intervals between said plates the teeth of a comb adapted to substantially fill these intervals, casting a solidifiable material on said edge and withdrawing the comb after the casting operation, said teeth being made of a non-adhesive material with respect to the solidifiable material of the casting. This process and the resulting sealed blocks are particularly useful in the field of fuel cells.

3 Claims, 7 Drawing Figures

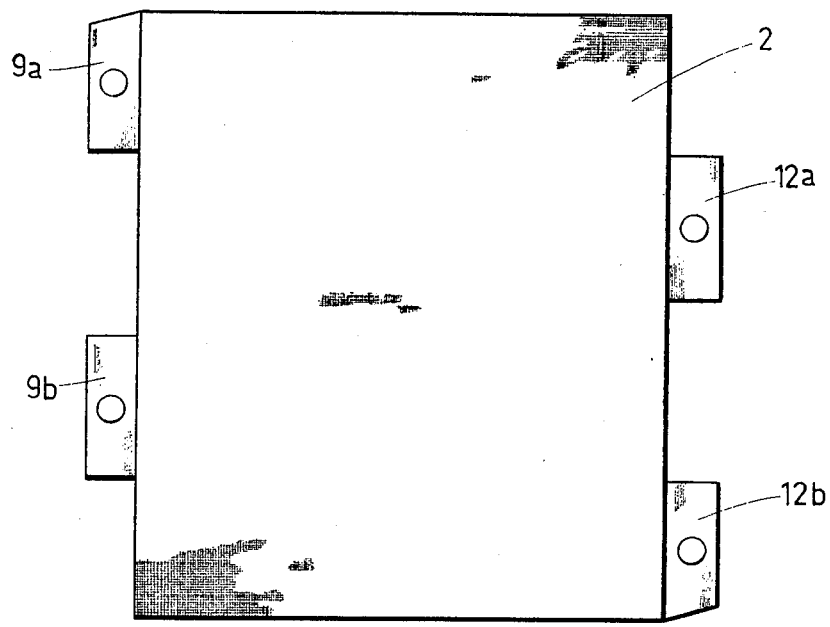
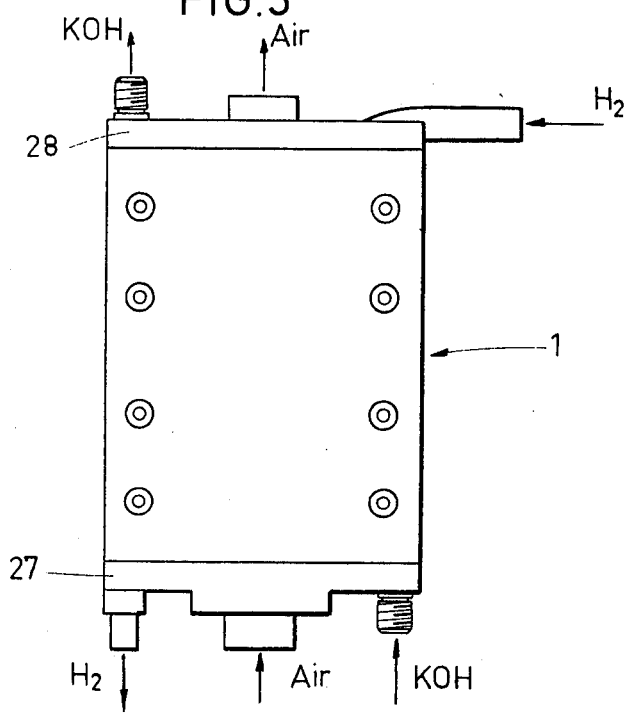

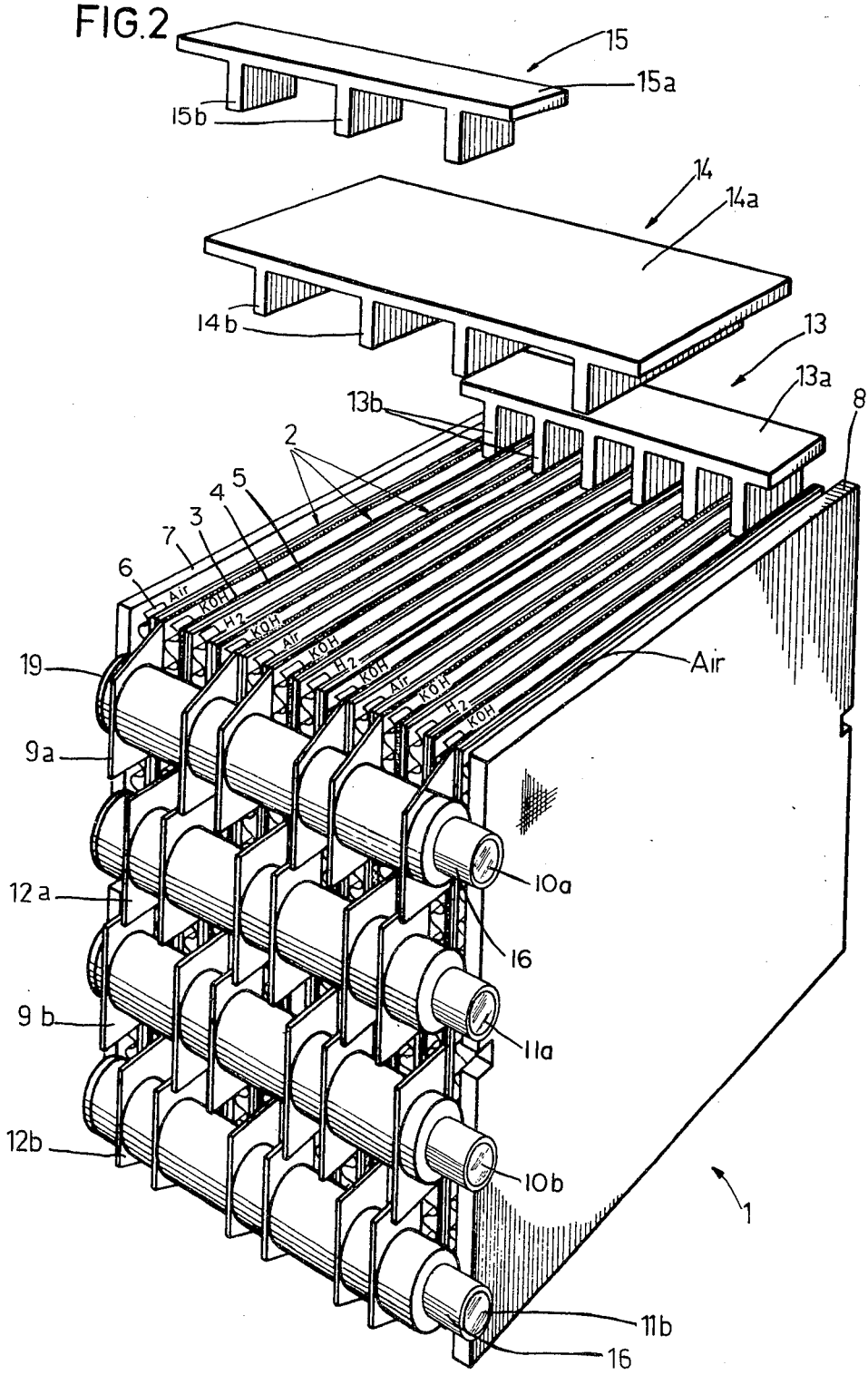

U.S. Patent  Aug. 9, 1977  Sheet 3 of 3  4,040,598
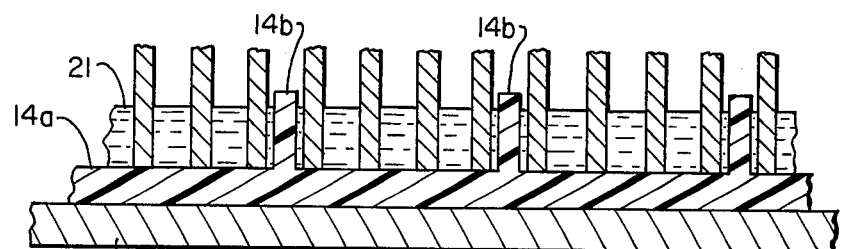
FIG. 3A
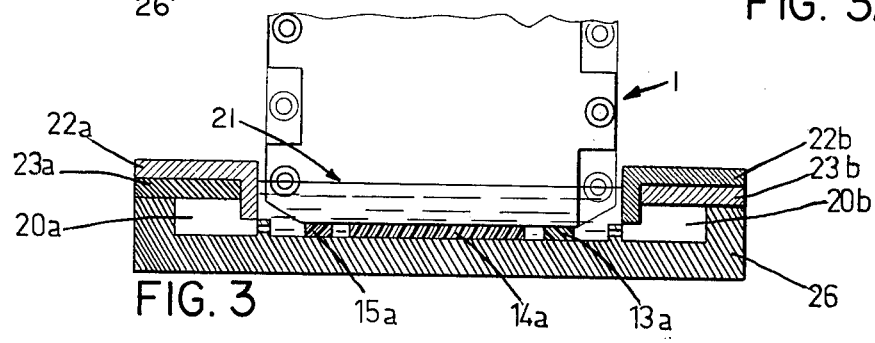
FIG. 3
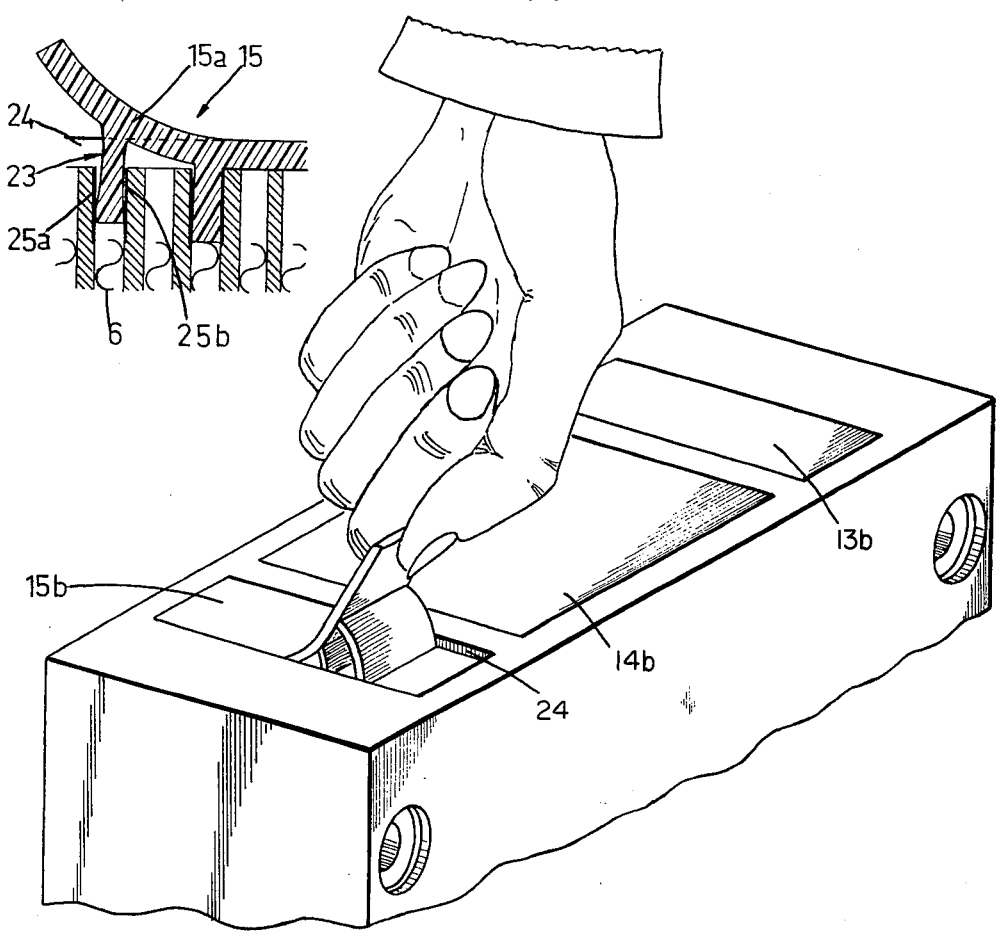
FIG. 4A
FIG. 4

DEVICE FOR THE SEALING OF A BLOCK FORMED OF A PILE OF PLATES, SUCH AS A BLOCK OF A FUEL CELL, WHILE MAINTAINING FREE PASSAGEWAYS BETWEEN THESE PLATES

This a division, of application Ser. No. 88,532 filed Nov. 12, 1970 now abandoned.

This invention relates to an apparatus for carrying out a process which can be used particularly for ensuring the sealing of a fuel cell, while providing inlet and outlet passageways therein.

Although the application of the invention to the manufacture of fuel cells is particularly contemplated, it will be apparent to those skilled in the art that the invention is applicable more generally in each case where a sealing must be effected on a block formed of a pile of plates spaced from one another while providing passageways between several plates on at least one edge of this block.

A fuel cell is formed of a piling of small thickness plates constituting the electrodes of the fuel cell, these plates being maintained in spaced relationship from one another by means of separating members providing for the flow, between two adjacent electrodes, of fluids consisting, according to this case of an electrolyte, an oxidizing gas (such as air or oxygen) and a reducing gas (such as, for example, hydrogen). The electrodes are electrically interconnected in such a manner as to constitute a series and/or parallel lay out, the connection being for example achieved by means of metal rods which furthermore ensure the mechanical cohesion of the piling formed by these electrodes.

It is a main object of this invention to provide an apparatus for the sealing of a block constituted of a pile of electrodes, while providing inlet and outlet ports for the fluids of the fuel cell within the spacing between the electrodes.

This object is achieved according to the invention by means of novel separating combs to be described hereinafter. With these combs the casting of an insulating resin on each edge of the block, within the electrode interspaces on a limited height with respect to the electrode edges, after the positioning of the separating combs, whose teeth are introduced in the electrode interspaces and extend over a distance from said edges at least equal to said height of the casting and over a width at least equal to that of the free passageway which must be provided for the flow of each fluid between the electrodes is accomplished.

The resin to be used may be of the type of a castable resin such as an epoxy resin, a polyester resin, a silicone, the selection of the resin used for the casting being however not critical.

According to a particular embodiment of the invention 10 which is not intended however to limit the scope of the invention, there can be used different separating combs for the inlet of the various fluids into the cell and for the outlet of said fluids from the cell, the spacing between the teeth of each comb being thus equal to the electrode interspaces through which flow the fluids corresponding to this comb.

It is an essential object of this invention to provide separating combs for performing the above-mentioned process which can be easily withdrawn without any liability of deterioration of the electrodes once the casting has been effected.

This object is attained according to a preferred but not limitative embodiment of the invention, by constituting the comb teeth with an elastic material resistant to tearing.

According to a preferred embodiment the combs will be made of a material of the above-mentioned type, having antiadhesive properties with respect to the material used for the sealing casting. There will be chosen for example, a silicon elastomer.

By the use of such a material for constituting the teeth of the separating combs, the withdrawal of the teeth from the resin casting will be easier due to the fact that the tensile strength exerted for disengaging the teeth successively will result in a decrease of their cross section accompanied with a lengthening thereof.

It is also convenient however to form the teeth of the combs of any other flexible material having a high resistance to tearing such as a plastified polyamide which can be elastically stretched, even if such a material does not exhibit anti-adhesive properties, provided that the comb teeth be coated, prior to the resin casting, with a thin film of a material which facilitates the stripping, due to its anti-adhesive properties, said material consisting forr example of polytetrafluoroethylene or of a silicone oil, or still of zonc stearate, this list of products for facilitating the stripping having non limitative character.

Non limitative embodiments of the invention will be further described with reference to the accompanying drawings wherein :

FIG. 1 illustrates an embodiment of electrode which can be used in a fuel cell,

FIG. 2 is a perspective view showing a fuel cell during its manufacturing stage at the time when the separating combs are introduced, before the casting of the sealing material, FIG. 3 is a partial view of the fuel cell placed in the mould in which is made the casting, FIG. 3A is an enlarged partial cross-sectional view of one spearating comb in position in FIG. 3 in the direction perpendicular to the plane of the page, FIG. 4 illustrates the withdrawal of the separating comb after the casting, FIG. 4A is an enlarged cross-sectional view of a detail of FIG. 4, and FIG. 5 shows the cell after the fluids inlet and outlet ducts have been placed in position.

In the embodiment illustrated by way of example in FIGS. 1 and 2, the electrodes 2 of the fuel cell 1 are plates of a small thickness formed of three superimposed layers, i.e., a layer 3 of a sintered metal such as nickel adapted to come into contact with the electrolyte, a median or intermediate layer 4 of pulverized carbon containing an oxidation or a reduction catalyst and a microporous layer 5 through which the gases can diffuse but which forms a seal for the electrolyte on the side of the electrode in contact with the oxidizing or reducing gas.

The electric current is collected by means of earshaped collectors 9a, 9b, 12b solid with the fritted metal layer of each electrode, said ear-shaped collectors being optionally provided on the same side of the fuel cell.

FIG. 2 shows an arrangement which may be suitable for a piling of the electrodes of a fuel cell. The spacing between the adjacent electrodes is maintained by means of separating and electrically insulating elements which may consist of a fabric of insulating material or still, as in the illustrated example, of ocrrugated rectangular plates 6 of insulating material, comprising cut out portions on the faces of the cell (such as the upper face in FIG. 2) which are provided with the fluids inlets and outlets at the places destined to the separating combs according to this invention, as indicated hereunder.

The electrodes are associated by pairs, each pair comprising two adjacent electrodes whose surfaces of sintered metal are facing each other and define an interelectrode spacing through which flows the electrolyte consisting, for example of a potash solution, indicated KOH of FIG. 2.

On the surfaces of the electrodes of each pair which are opposite to those facing each other, are flowing respectively a reducing gas such as hydrogen, for one electrode called hydrogen electrode and an oxidizing gas, such as air, for the other electrode of the pair, called air electrode.

FIG. 2 shows the arrangement of the successive air electrodes and hydrogen electrodes in the piling forming the fuel cell. This piling is enclosed between two terminal plates 7 and 8 of an electrically insulating material, said two plates being mechanically connected to each other through securing means, not shown, which may include threaded rods.

The ear-shaped current collectors of the air electrodes are electrically interconnected through junction metal rods such as rod 10a for ear-shaped collector 9a and rod 10b for collectors 9b.

Similarly the ear-shaped current collectors of the hydrogen electrodes are interconnected through metal rods such as rod 11a for collectors 12a and rod 11b for collectors 12b.

In order to constitute a battery of cell elements by connection in series of several elements, the positive pole of an element being connected to the negative pole of the adjacent element, while making use the same junction rods such as 10a, 10b, 11a, 11b, for mechanically supporting the ear-shaped collectors of all the cell elements the polarity of which changes from one cell element to the next, it is necessary to electically insulate the ear-shaped connectors from the rods 10a, 10b, 11a and 11b passing therethrough, for example by means of an insulating sheath such as sheath 16 (FIG. 2) enclosing each of said rods.

In such an embodiment the rods 10a, 10b, 11a and 11b which act only as a mechanical support and not for collecting the current, carry conducting rings for collecting current, placed between the ear-shaped collectors traversed by said rods and at both ends of the piling, said rings providing for the electrica connection between the ear-shaped collectors and the external electrical circuit.

The assembly of the ear-shaped collectors and current collecting metal rings is branched through the intermediary of an electrical connection device (not shown) on the electric circuit fed by the cell.

According to the invention the sealing of the block formed of the electrodes piling is achieved by casting of a solidifiable material conducting electricity, such as a resin, while preserving, during the casting operation, free spaces for the fluids inlet and outlet passages of the cell between the electrodes thereof by means of separation combs of a particular type.

In the embodiment illustrated, only by way of example in FIGS. 2 to 5 wherein the fluids inlet and outlet passages of the cell are provided on both opposite edges of the electrodes piling which have no ear-shaped collectors, as shown in FIG. 5, there are placed on each of said edge of the piling, before the casting operation, three separation combs such as combs 13, 14 and 15 (FIG. 2) to preserve, during the casting, passages respectively destined to the electrolyte, the air and the hydrogen streams.

Each of these combs is formed of a bed plate (13a, 14a or 15a) provided with teeth (13b, 14b, 15b).

The spacing between the teeth of each comb is substantially equal to that between the electrode interspaces where is flowing the fluid corresponding to this comb.

The height of the teeth is at least equal to that of the casting of the resin in the electrode inerspaces and the width of the teeth is chosen in accordance with that of the passage to leave free for each fluid flowing between the electrodes.

This width is accordingly determined in each case as a function of the designed flow rate through the cell of the fluid corresponding to the considered separation comb.

The teeth thickness is chosen slightly lower than the spacing between the electrodes through which they have to be engaged, in order, on the one hand, to facilitate their insertion into said spacings and, on the other hand, to leave a sufficient space for the formation of a very thin film of resin between each tooth and the facing surfaces of the electrodes on both sides of each tooth, during the casting operation, as seen in FIGS. 3A.

After engagement of the separation combs on one edge of the block destined to constitute the cell 1, the casting of the sealing resin may be carried out on this edge, for example in the manner shown in FIG. 3, by placing the block into the mould 26 wherein the liquid resin level 21 defining the casting height on the considered edge of the block 1, may be adjusted for each of the four block edges by making use of chocks 22a, 22a, 23a, 23b.

A resin casting is thus effected on each edge of the block, i.e not only on those comprising passages for the diferent fluids but also on both edges provided with current ear-shaped collectors connected through such junction rods as 10a, 10b, 11b.

The casting is performed through the casting recesses 20a, 20b, provided in the mould.

When the casting on the four edges of the piling has been achieved, tthe fuel cell appears as a parallelipipedic block as shown in FIG. 4.

FIGS. 4 and 4a illustrate the step of withdrawing a separation comb such as comb 15 after a resin casting has been performed on the edge of the block provided with said comb, resulting in the deposition of a sealing layer 24.

This withdrawal is performed by pulling on the bed plate 15b of comb 15 so as to successively disengage the teeth thereof.

This withdrawal is easily performed without liability of tearing out the resin films 25a, 25b (FIG. 4A) which have been formed during the casting on the electrodes surfaces facing each tooth, by penetration of the resin into the small spacing kept free between said tooth and the electrodes, this easy withdrawal being obtained, according to the invention by forming the separation combs or at least the teeth thereof, in an elastic material having anti-adhesive properties or previously coated off a thin film anti-adhesive with respect to the resin of the casting.

In these conditions the traction force exerted for successively withdraw the teeth of each comb results in a decrease of the cross-section of teeth of elastic material, indicated at 23 in FIG. 4 A, and the tooth which does not adhere to the resin films 25a, 25b is thus easily disengaged.

After removal of the separation combs, the two edges of the block provided with the fluid passages are grinded and plates 27 and 28 are respectively fastened by sticking or screwing on said edges (FIG. 5), said plates being provided with inlet and outlet ducts for the various fluids, facing the passages left free in the block after removal of the separation combs according to the invention.

From the foregoing description, one skilled in the art can easily ascertain the essential characteristics of this invention, and, without departing from the spirit and scope thereof, can make various changes to adapt it to various usages and conditions. Consequently, such changes and modifications are properly, equitably and intended to be within the full range of equivalence of the following claims.

I claim:

1. A flexible elastic separation comb in combination with a block formed of a pile of spaced plates which is to be sealed by a solidifiable material, said comb comprising a longitudinal base having spaced teeth secured to and extending therefrom, said teeth having a thickness slightly smaller than the width of corresponding spaces between adjacent plates in which respective teeth are inserted, the spacing of the teeth on said base corresponding to the distance between the spaces formed between the plates in which respective teeth are inserted, said teeth having a width less than the width of said plates and a height at least equal to the height of the solidifiable material used to seal the block, wherein the thickness of said teeth and the spacing between adjacent teeth are so selected that small spaces are maintained between each tooth and the facing surfaces of adjacent plates on both sides of each tooth whereby a film of solidifiable material is formed between each tooth and said facing surfaces as said block is sealed.

2. The combination of claim 1, wherein said plates comprise fuel cell electrodes.

3. The combination of claim 2, wherein said fuel cell electrodes have surfaces of sintered metal.

* * * * *